July 3, 1934. H. HOLZWARTH Re. 19,228
MULTISTAGE COMBUSTION TURBINE
Original Filed Aug. 17, 1926 2 Sheets-Sheet 1
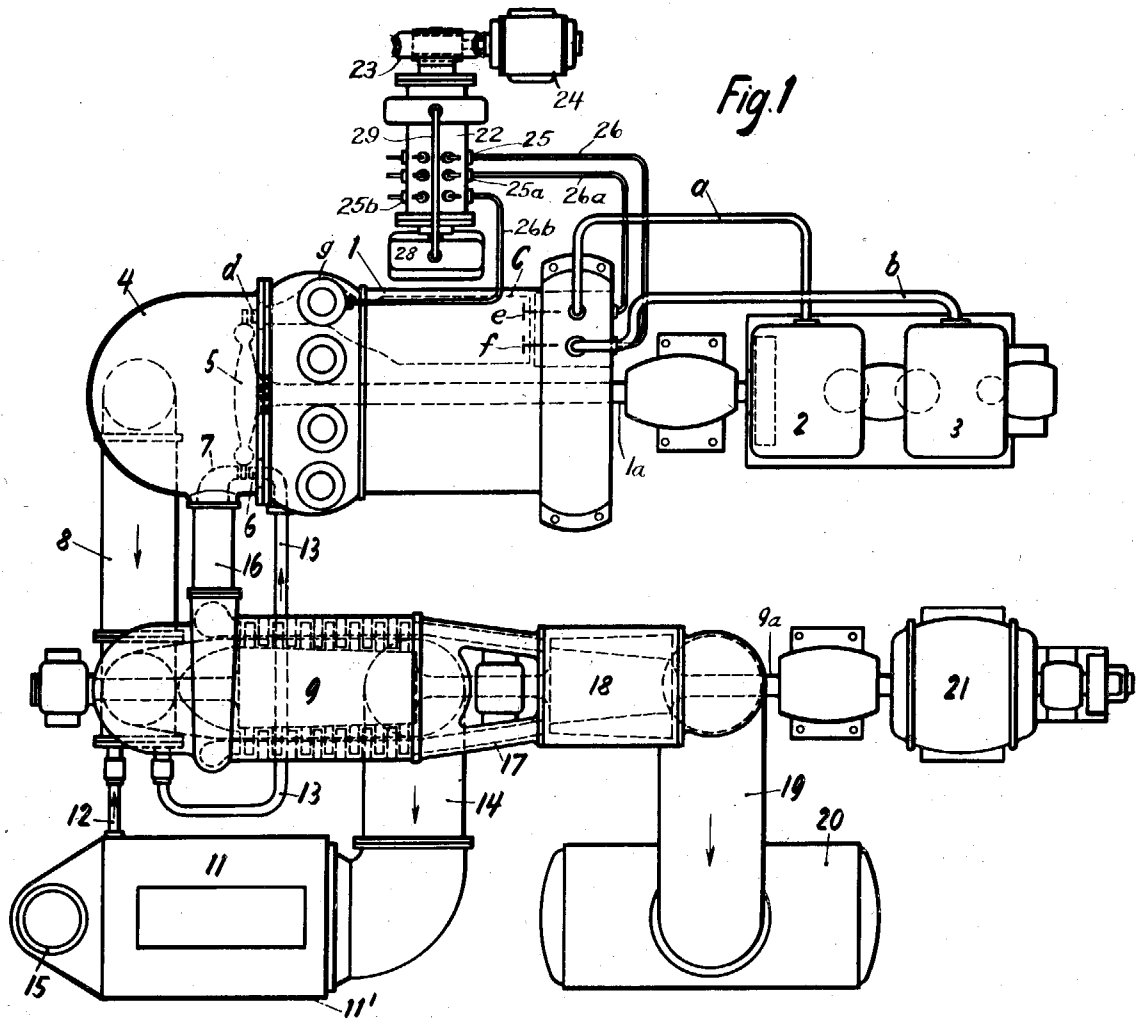
INVENTOR
HANS HOLZWARTH
BY Joseph Hirschman
ATTORNEY July 3, 1934. H. HOLZWARTH Re. 19,228
MULTISTAGE COMBUSTION TURBINE
Original Filed Aug. 17, 1926 2 Sheets-Sheet 2
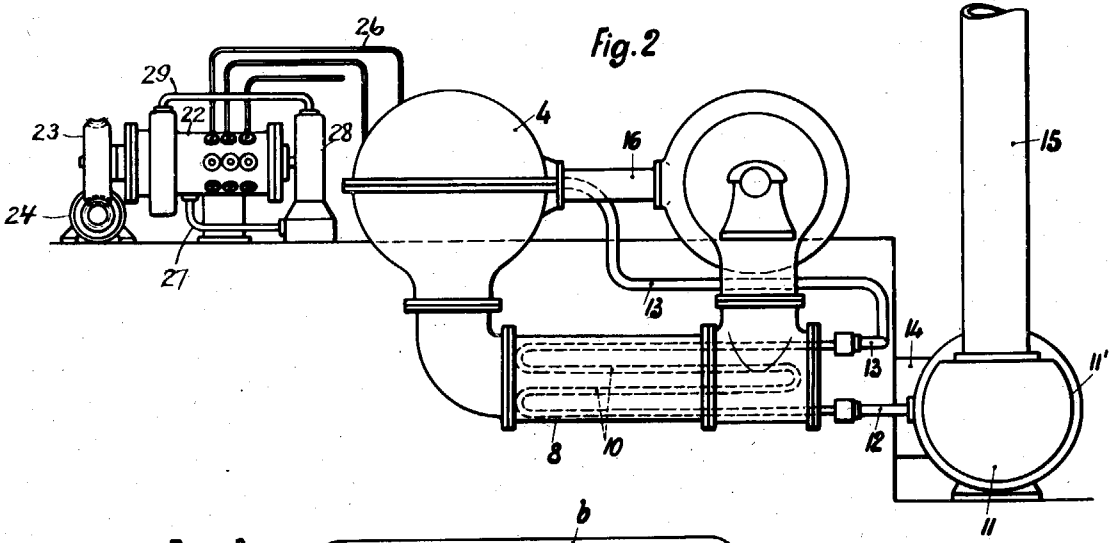
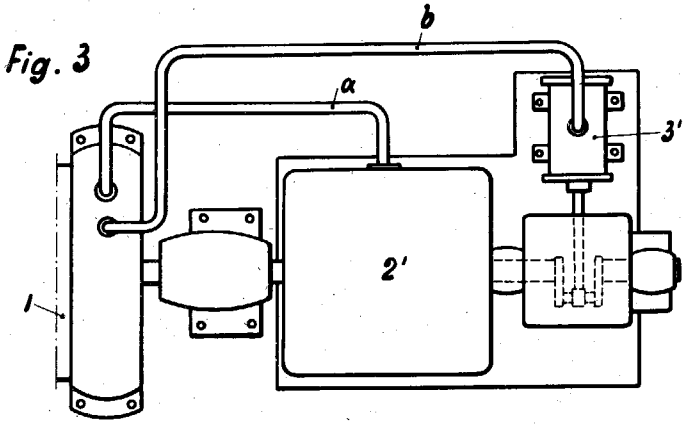
INVENTOR
HANS HOLZWARTH
BY Joseph Hirschman
ATTORNEY Reissued July 3, 1934

Re. 19,228

UNITED STATES PATENT OFFICE 19,228

MULTISTAGE COMBUSTION TURBINE

Hans Holzwarth, Dusseldorf, Germany, assignor to Holzwarth Gas Turbine Co., San Francisco, Calif., a corporation of Delaware Original No. 1,757,045, dated May 6, 1930, Serial No. 129,739, August 17, 1926. Renewed August 24, 1929. Application for reissue January 9, 1932, Serial No. 585,792

6 Claims. (Cl. 60—49)

My present invention relates to multi-stage explosion turbines operated by combustion gases, and has for its object to provide a novel and very advantageous combination of the several stages of the turbine and the machinery driven thereby. In carrying out my invention, I prefer to use the high-pressure stage chiefly or exclusively for operating the auxiliary devices which supply air and fuel to the combustion chamber, while the power of the other stages is employed to drive the dynamo or other machine actuated by the turbine. I accordingly mount the high pressure turbine stage and the lower pressure turbine stage or stages upon different shafts, and so distribute the expansion or pressure drops of the combustion gases in the several stages, that there is generated in the high pressure stage only so much power as is required to operate the auxiliary mechanism, such as the air compressor, or the air compressor and the fuel pump, while the available power output of the plant is generated in the lower turbine stage or stages. In this way I secure the advantage that an alternating current generator driven by the lower turbine stage or stages may be driven at the fixed speed predetermined by its number of poles and frequency, while the high pressure turbine, whose most economical speeds, due to the peculiar character of its working process, lie within comparatively narrow limits, may be operated within such limits, particularly as the speeds of the air compressor and fuel pump, which are purely auxiliary machines, can be adjusted to that of the high pressure turbine. My invention may be embodied in an explosion gas turbine plant in which steam is generated with the waste heat of the gases and is employed to cool, and if desired also to drive, the high pressure gas turbine, it being understood that also in such a plant only so much power is produced in the high pressure stage as is necessary to drive the auxiliary machine or machines. Other features of my invention will appear from the description following hereinafter.

Reference is to be had to the accompanying drawings, in which Fig. 1 is a plan view and Fig. 2 a side elevation showing a typical and satisfactory embodiment of my invention, while Fig. 3 is a partial plan view illustrating a slightly different form of the improvement.

The high pressure turbine 1 is of any suitable construction, but I prefer an explosion gas turbine of a type developed by me, an instance of which is disclosed in my pending application for Letters Patent of the United States, Serial No. 47,422, filed August 1, 1925, which issued on October 10, 1933 as Patent No. 1,929,427. This turbine is coupled with the air compressor 2 and the gas compressor 3, preferably turbo-compressors of a well-known type having their rotors mounted directly on the turbine shaft 1*a*. By conduits *a* and *b* the air and gas respectively are conveyed to the explosion chambers such as *c* which they enter through air and fuel valves *e* and *f*, the combustion gases then passing to nozzles *d* through nozzle or outlet valves *g* and into the exhaust chamber 4, operating the turbine rotor 5 by the gas jets issuing from the nozzles. Any suitable device is provided for igniting the combustible mixture in the chambers *c*. The operation and control of the valves in this type of explosion turbine are well known in the art and have been described e. g. in my Patent No. 877,194. Fig. 1 of the drawings shows diagrammatically a hydraulic distributor of the type described in such patent, such distributor comprising a hollow rotating cylinder mounted within a casing 22, the cylinder being driven through gearing 23 by a motor 24. The cylinder is provided with a series of circumferential channels which periodically register with the peripheral series of ports 25, 25*a* and 25*b* in the casing 22 and charge oil under pressure into the respective series of conduits 26, 26*a* and 26*b* leading to the control pistons and cylinders of the valves *f*, *e* and *g*. There are as many groups of ports 25, 25*a* and 25*b* as there are explosion chambers *c* associated with the turbine 5. As the cylinder of the distributor rotates it causes actuation of the valves *e*, *f* and *g* of the several chambers in predetermined sequence, the distributor being provided with an exhaust space with which the conduits 26, 26*a* and 26*b* are brought into communication at the proper instants to relieve the valve pistons of pressure and permit such valves to close under the action of their springs (not shown). The exhausted oil is conveyed by pipe 27 to the suction side of the pump 28 which delivers the oil under pressure into the interior of the distributor cylinder through the pipe 29. When liquid fuel, such as oil, is used instead of gas, the air compressor is made relatively larger, as indicated at 2′ in Fig. 3, and a liquid-fuel pump such as indicated at 3′ (generally of the reciprocating piston type) is substituted for the gas compressor 3.

The pressure prevailing in the exhaust chamber 4 is above atmospheric pressure. The rotor 5 is cooled by passing through its blade channels, high-pressure steam discharged through a set of stationary nozzles 6 and collected, after passing through the rotor, in correspondingly catch nozzles 7. The pressure of the steam at the outlet of nozzles 6 and at the inlet of nozzles 7 is preferably substantially equal to the pressure of the combustion gases in the exhaust chamber 4, and in such a case neither the steam nor the combustion gas will have a tendency to pass through the unavoidable gaps between the rotor and the nozzles 6 and 7 and to mix with each other. From the exhaust chamber, the combustion gases pass through a conduit 8 to the intermediate pressure turbine 9, which may be of any suitable construction, and is mounted upon a shaft 9*a* separate from the shaft 1*a* of the high-pressure turbine 1. In the conduit or pipe 8 are arranged superheater coils 10 to which wet high-pressure steam is conveyed from the boiler 11 through a pipe 12. The superheated steam is conveyed by the pipe 13 to the high-pressure steam nozzle 6. The exhaust combustion gases pass through the pipe 8 to the intermediate pressure turbine 9 where they perform work and then exhaust, at atmospheric pressure, through the pipe 14 to the pipe or casing 11′ which contains the boiler 11, and after generating steam in such boiler, the exhaust combustion gases pass out to the atmosphere through the exhaust pipe 15.

The steam collected by the catch nozzles 7 passes through a path separate from that of the combustion gases, being conveyed from the said nozzles through a pipe 16 to the steam nozzles of the intermediate pressure turbine 9. It will be understood that both the high-pressure turbine 1 and the intermediate pressure turbine 9 are of the type (exemplified by my Patent No. 1,929,-427 referred to above) in which there are two kinds of nozzles for delivering a gaseous medium to the rotor, one kind of nozzles discharging steam, and the other combustion gases under pressure. The intermediate pressure turbine 9 has catch nozzles 17 to receive the steam and convey it to a low pressure turbine 18, which therefore is actuated by steam alone. After performing work in the turbine 18, the low pressure steam passes through an exhaust pipe 19 to the condenser 20.

The intermediate pressure turbine 9 and the low pressure turbine 18 are coupled with the machinery to be driven, for instance a dynamo 21, the armature of which may be mounted directly on the common shaft 9*a* of said turbines 9 and 18. The ratio of the number of revolutions of the high pressure rotor to that of the intermediate and low pressure rotors may be selected arbitrarily. By a proper choice of the combustion pressure or explosion pressure in the chambers *c*, and of the counterpressure in the exhaust chamber 4, I may so proportion the horse-power of the high pressure turbine 1 and of the subsequent stages that the high pressure combustion gas turbine will supply just enough power to operate the compressors or pumps (2, 3 or 2′, 3′) while the power of the turbines 9 and 18 will be used exclusively for driving the dynamo 21 or other machinery. While this is the preferred way of carrying out my invention, I do not desire to restrict myself thereto.

Various modifications may be made without departing from the nature of my invention as set forth in the appended claims.

I claim:

1. A multiple stage turbine arrangement comprising a high-pressure explosion turbine having an explosion chamber and connections for delivering the gases therefrom to the rotor of said turbine, devices, driven by said turbine, for feeding fuel and air under pressure to said chamber, a discharge nozzle arranged adjacent to the path of said rotor, on one side of said path, a catch nozzle arranged on the other side of said path to receive the medium issuing from said discharge nozzle, an intermediate pressure turbine arranged to rotate independently of said explosion turbine and having two kinds of discharge nozzles in operative relation to its rotor, a connection leading from said catch nozzle to the discharge nozzles of one kind, another connection for leading the exhaust combustion gases from the high pressure turbine to the discharge nozzles of the other kind, a boiler heated by the exhaust combustion gases from the intermediate pressure turbine, a connection for leading the steam generated in said boiler to the discharge nozzle of the high pressure turbine, and a low pressure turbine coupled with said intermediate pressure turbine and driven by the exhaust steam of the same.

2. A multiple stage turbine arrangement comprising a high-pressure explosion gas turbine having an explosion chamber and connections for delivering the gases therefrom to the rotor of said gas turbine, devices, driven by said turbine, for feeding fuel and air under pressure to said chamber, a discharge nozzle arranged adjacent to the path of said rotor, on one side of said path, a catch nozzle arranged on the other side of said path to receive the medium issuing from said discharge nozzle, an intermediate pressure turbine having two kinds of discharge nozzles in operative relation to its rotor, a connection leading from said catch nozzle to the discharge nozzles of one kind, a conduit for leading the exhaust combustion gases from the high pressure turbine to the discharge nozzles of the other kind, a boiler heated by the exhaust combustion gases from the intermediate pressure turbine, a connection including a superheater coil arranged in said conduit, for leading the steam generated in said boiler to the discharge nozzle of the high pressure turbine, and a low pressure turbine driven by the exhaust steam of the intermediate pressure turbine, the rotors of said intermediate pressure turbine and of said low pressure turbine being mounted on the same shaft.

3. A multiple stage turbine arrangement comprising a high-pressure explosion gas turbine having an explosion chamber and connections for delivering the gases therefrom to the rotor of said gas turbine, devices, driven by said turbine, for feeding fuel and air under pressure to said chamber, a discharge nozzle arranged adjacent to the path of said rotor on one side of said path, an exhaust chamber in which the exhaust combustion gases from said high pressure turbine are received under a pressure above atmospheric, a catch nozzle arranged in said chamber on the other side of the rotor path to receive the medium issuing from said discharge nozzle, an intermediate pressure turbine having two kinds of discharge nozzles in operative relation to its rotor, a connection leading from said catch nozzle to the discharge nozzles of one kind, a conduit for leading the combustion gases from said exhaust chamber to the discharge nozzles of the other kind, a boiler heated by the exhaust combustion gases escaping from the intermediate pressure turbine at substantially atmospheric pressure and provided with an exhaust port for conducting said gases into the atmosphere, a connection including a superheater coil arranged in said conduit, for conveying the steam generated in said boiler to the discharge nozzle of the high pressure turbine, a low pressure turbine driven exclusively by the exhaust steam of the intermediate pressure turbine, and a vacuum condenser connected with said low pressure turbine to receive the exhaust steam therefrom.

4. A multiple stage turbine arrangement comprising a high pressure turbine the rotor of which is driven by combustion gases under pressure, a discharge nozzle arranged adjacent to the path of said rotor on one side of said path, an exhaust chamber in which the exhaust combustion gases from said high pressure turbine are received under a pressure above atmospheric, a catch nozzle arranged in said chamber on the other side of the rotor path to receive the medium issuing from said discharge nozzle, an intermediate pressure turbine arranged to rotate independently of said high pressure turbine and having two kinds of discharge nozzles in operative relation to its rotor, a connection leading from said catch nozzle to the discharge nozzles of one kind, a conduit for leading the combustion gases from said exhaust chamber to the discharge nozzles of the other kind, a boiler heated by the exhaust combustion gases escaping from the intermediate pressure turbine at substantially atmospheric pressure, a connection including a superheater coil arranged in said conduit for conveying the steam generated in said boiler to the discharge nozzle of the high pressure turbine, and a condensing low pressure turbine driven by the exhaust steam of the intermediate pressure turbine and coupled therewith.

5. A multiple stage turbine arrangement comprising a high pressure explosion turbine and a lower pressure continuous current turbine mounted upon separate shafts, a plurality of explosion chambers and means for charging the same periodically with explosive mixtures of fuel and air, said chambers provided with means for discharging the exploded gases intermittently against said explosion turbine, an exhaust chamber in which the gases exhausting from said explosion turbine are received at a pressure above atmospheric, auxiliary mechanism including a rotary air compressor coupled with the shaft of the explosion turbine to be driven thereby, such turbine driving only said auxiliary mechanism and not contributing to the available output of the plant, said exhaust chamber arranged to deliver the exhaust gases of the explosion turbine to the continuous current turbine to operate the latter, a boiler, a conduit for conveying to the latter the gases exhausting from the last mentioned turbine to generate steam in said boiler, a steam turbine coupled to the shaft of the latter turbine, means for charging the so generated steam into said steam turbine, and mechanism driven by said continuous current turbine and said steam turbine and receiving therefrom the available output of the plant.

6. A multiple stage turbine arrangement comprising a high pressure explosion turbine and a lower pressure continuous current turbine mounted upon separate shafts, a plurality of explosion chambers and means for charging the same periodically with explosive mixtures of fuel and air, said chambers provided with means for discharging the exploded gases intermittently against said explosion turbine, an exhaust chamber in which the gases exhausting from said explosion turbine are received at a pressure above atmospheric, auxiliary mechanism including a rotary air compressor coupled with the shaft of the explosion turbine to be driven thereby, such turbine driving only said auxiliary mechanism and not contributing to the available output of the plant, said exhaust chamber arranged to deliver the exhaust gases of the explosion turbine to the continuous current turbine to operate the latter, a boiler arranged to receive heat from the explosion gases for generating steam, a steam turbine, means connected to said boiler for charging steam into said steam turbine, and mechanism driven by said continuous current turbine and said steam turbine and receiving therefrom the available output of the plant.

HANS HOLZWARTH.